No. 648,152. Patented Apr. 24, 1900.
S. A. LOESSNER.
MANURE SCATTERING MACHINE.
(Application filed Mar. 28, 1899.)
(No Model.)

Witnesses:
Hans Brenner.
Paul Seiler.

Inventor:
Selma Anna Loessner
by Gerson & Sachse
her Attorneys

UNITED STATES PATENT OFFICE.

SELMA ANNA LOESSNER, OF OBER-RÖDERN, GERMANY.

MANURE-SCATTERING MACHINE.

SPECIFICATION forming part of Letters Patent No. 648,152, dated April 24, 1900.

Application filed March 28, 1899. Serial No. 710,838. (No model.)

*To all whom it may concern:*

Be it known that I, SELMA ANNA LOESSNER, a subject of the Emperor of Germany, residing at Ober-Rödern, Radeburg, near Dresden, Kingdom of Saxony, German Empire, have invented new and useful Improvements in Manure-Scattering Machines, of which the following is a full, clear, and exact description.

The object of the invention is improvements in manure-scattering machines in order to readily scatter farm-yard manure—i. e., the tenacious dung of cattle mixed with particles of hay, straw, litter of leaves, and the like—which heretofore had to be scattered by means of dung-forks.

The invention consists of certain parts and details and combinations of the same, as will be fully described hereinafter and then pointed out in the claims.

Reference is to be had to the accompanying drawings, forming part of this specification, in which similar letters indicate corresponding parts in the various figures.

Figure 1:
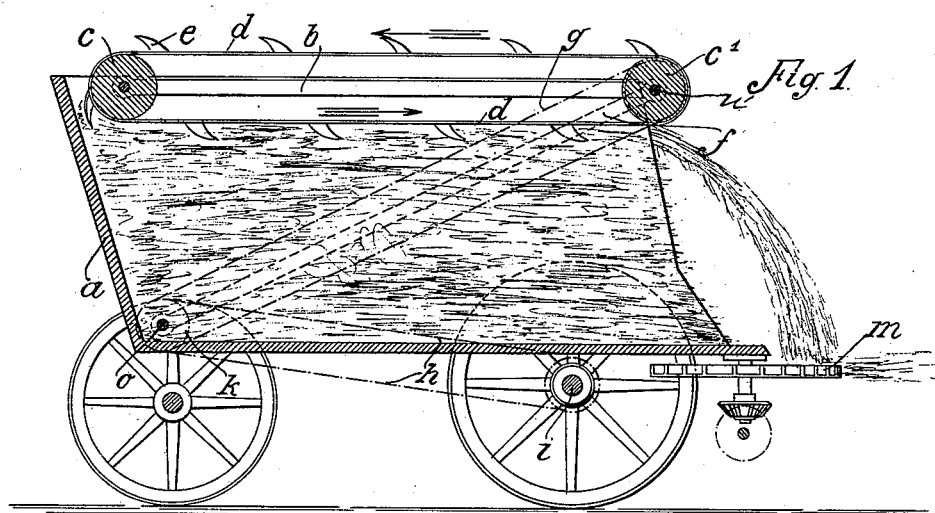
Figure 2:
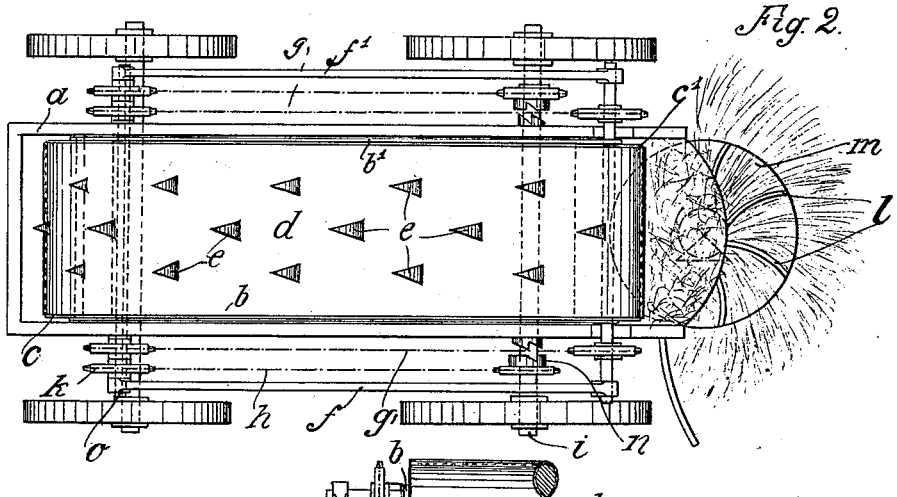
Figure 3:
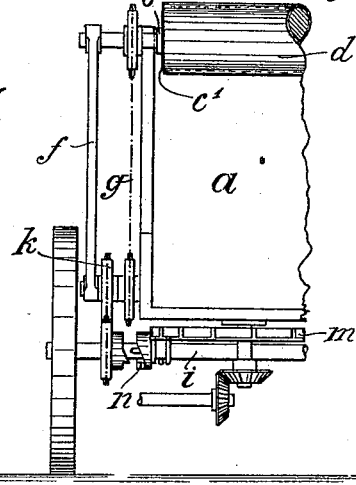

Figure 1 is a longitudinal section. Fig. 2 is a plan view. Fig. 3 is a detail rear view.

In all the figures the unimportant parts having nothing to do with this invention are omitted.

The machine consists of a four-wheeled dung-wagon upon which the devices for tearing and scattering the manure are mounted. The wagon $a$ has the form of a parallelogram inclined toward the front and is provided in the ordinary manner with two hind wheels and two steering front wheels. While the dung is being filled into the wagon, the rear end of this latter is to be kept closed by means of a board, which when the machine is to be started up is removed. Upon the surface of the dung filling the wagon two rollers $c\ c'$ are placed, which are connected by means of two side members $b\ b'$, one on either side, the ends of which journal the ends of roller-axles $u\ u'$. An endless band or belt of flexible material $d$ is placed around the said rollers and is provided upon its outer surface with a number of oblique teeth or hooks $e$, the points of which face rearward upon the lower stretch of band. The axle $u'$ of roller $c'$ extends beyond the side walls of the wagon, as shown in Figs. 1 and 3, and carries at either side toothed wheels $t\ t'$, which stand in connection with toothed wheels $k\ k'$, revolubly mounted upon shafts $o\ o'$, fastened upon the outer side of the side walls of the wagon by means of link chains $g\ g'$. The toothed wheels $k\ k'$ receive their rotary motion by means of link chains $h\ h'$ from toothed wheels $v\ v'$, revolubly mounted upon the hind axle $i$, to which they may be coupled by means of clutches or couplings $n$. For keeping the chains $g\ g'$ always taut side members $f\ f'$ are loosely fitted on one end over the shafts $o\ o'$ and on the other end over the axle $u'$ of the roller $c'$.

During the driving of the wagon to the place to be manured the clutches $n$ are to be kept thrown out, so that no motion is imparted to the various parts; but as soon as the toothed wheels $v\ v'$ are coupled to the wagon hind axle $i$ rotary motion is imparted to the various toothed wheels and to the roller $c'$. The endless band or belt $d$ thereby is caused to travel around in the direction of the arrow, Fig. 2. The teeth or hooks $e$ thereby rake off the surface of the dung, take the raked-off particles along, and cause them to fall down in the rear of the load of dung, as is shown by Fig. 2. Underneath the bottom board of the wagon and extending partly over the rear edge of it a disk $m$ is revolubly arranged, being provided with a number of radially-disposed ribs $l$. The disk receives its rotary motion from the hind axle $i$ by means of a gearing. (Not shown in the drawings.) The disk is traveling at a relatively high speed, and the centrifugal force of it causes the particles of dung falling down upon it to be scattered sidewise over a broad tract, Fig. 1. In order to prevent dung from being thrown into the hind wheel and the gearings on the side of the throw, a protecting-shield $x$ is provided, as is shown in Fig. 1.

In proportion to the decrease of the dung the roller-frame, with the endless belt, sinks, the axle $u'$ of roller $c'$ being conducted in the arc of a circle around the shafts $o\ o'$ by the side members $f$ until, when the dung has all been disposed of, the roller-frame and the side members $f\ f'$ lie parallel to the bottom board of the wagon.

By exchanging the ribs $l$ of the revolving disks $m$ for curved blades and by providing scoop-blades for the hooks or teeth $e$ upon the endless belt the machine may be used for scattering compost, lime, or soil. The manure-scattering parts, as also the various gearings, are easily detachable, so that after removing them the wagon may be used for other purposes.

What I claim, and desire to secure by Letters Patent, is—

1. In a manure-scattering machine the combination of a four-wheeled wagon, an endless belt $d$ having teeth $e$ and traveling horizontally over rollers $c$, $c'$ within the wagon, from the front to the rear, side members $f$, $f'$, connecting the axle $u'$ of roller $c'$ with the shafts $o$, $o'$, rigidly mounted upon the sides of the wagon, chains $g$ $g'$ running over the toothed wheels $k$ $k'$, loosely mounted upon the said shafts $o$, $o'$ and over the toothed wheels $t$, $t'$ fast upon the axle $u'$, and chains $h$, $h'$ transmitting the rotary motion of the toothed wheels $v$, $v'$ fast upon the hind-wheel axle $i$ to the said toothed wheels $k$, $k'$, all for the purpose set forth.

2. In a manure-scattering machine the combination of a wagon $a$, an endless belt $d$, having teeth $e$ and traveling horizontally over rollers $c$, $c'$ within the said wagon from the front to the rear, side members $f$, $f'$ connecting the axle $u'$ of roller $c'$ with the shafts $o$, $o'$ rigidly mounted upon the sides of the wagon, chains $g$ $g'$ running over the toothed wheels $k$, $k'$, loosely mounted upon the said shafts $o$, $o'$ and over the toothed wheels $t$, $t'$ fast upon the axle $u'$, chains $h$, $h'$ running over the said toothed wheels $k$, $k'$ and over toothed wheels $v$, $v'$, mounted loosely upon the hind-wheel axle $i$, and couplings or clutches $n$, $n'$, one part of which is secured to the said toothed wheels $v$, $v'$ and the other part of which is slidingly arranged by key and feather to the axle $i$, the parts being arranged constructed and working substantially as described.

SELMA ANNA LOESSNER.

Witnesses:
FRANZ WEIDLY,
HERNANDO DE SOTO.